(12) United States Patent
Zozgornik

(10) Patent No.: US 10,935,206 B2
(45) Date of Patent: Mar. 2, 2021

(54) ILLUMINATION DEVICE, IN PARTICULAR VEHICLE HEADLAMP

(71) Applicant: Lumileds Holding B.V., Schiphol (NL)

(72) Inventor: Steffen Zozgornik, Leverkusen (DE)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/523,824

(22) Filed: Jul. 26, 2019

(65) Prior Publication Data

US 2020/0032980 A1 Jan. 30, 2020

(30) Foreign Application Priority Data

Jul. 27, 2018 (EP) ..................................... 18185967

(51) Int. Cl.
*F21S 41/675* (2018.01)
*F21S 41/24* (2018.01)
(Continued)

(52) U.S. Cl.
CPC ........... *F21S 41/675* (2018.01); *F21S 41/125* (2018.01); *F21S 41/16* (2018.01); *F21S 41/24* (2018.01);
(Continued)

(58) Field of Classification Search
CPC ................................ F21S 41/24; F21S 41/176
See application file for complete search history.

(56) References Cited

U.S. PATENT DOCUMENTS

| 2011/0044046 A1 | 2/2011 | Abu-Ageel |
| 2011/0148280 A1* | 6/2011 | Kishimoto ............. F21S 45/70 313/483 |

(Continued)

FOREIGN PATENT DOCUMENTS

| DE | 102014223933 A1 | 5/2016 |
| EP | 3029370 A2 | 6/2016 |

(Continued)

OTHER PUBLICATIONS

Extended European Search Report dated Jan. 22, 2019, European Patent Application No. 18185967.9, 8 pages.
(Continued)

*Primary Examiner* — Matthew J. Peerce

(57) ABSTRACT

An illumination device comprises one or several lasers emitting light of a first wavelength or wavelength range, a wavelength converting member converting at least part of the light of the first wavelength or wavelength range into light of a second wavelength or wavelength range, a scanning unit adapted to scan one or several laser beams of said one or several lasers across said wavelength converting member in order to generate an illumination pattern formed at least of the light of the second wavelength or wavelength range, and, optionally, an imaging optics imaging said illumination pattern to the far field. A first light guiding structure is arranged on a light emitting side of said wavelength converting member, said first light guiding structure forming a grid of first light guiding channels. The illumination device can be used as an adaptive headlamp of a vehicle and achieves a high contrast between illuminated and dark regions as well as a high efficiency with a small projection optics.

18 Claims, 2 Drawing Sheets

(51) Int. Cl.
  *F21S 41/30*   (2018.01)
  *F21S 41/16*   (2018.01)
  *F21S 41/125*  (2018.01)
  *F21S 41/40*   (2018.01)
  *F21Y 115/30*  (2016.01)

(52) U.S. Cl.
  CPC ............... *F21S 41/30* (2018.01); *F21S 41/40* (2018.01); *F21Y 2115/30* (2016.08)

(56) References Cited

U.S. PATENT DOCUMENTS

2015/0338044 A1* 11/2015 Singer .................... F21S 45/70
                                                    362/510
2018/0259156 A1*  9/2018 Hechtfischer ........... F21S 41/25

FOREIGN PATENT DOCUMENTS

| EP | 3267093 A1    | 1/2018 |
| JP | 5662599 B2    | 2/2015 |
| JP | 2015170564 A  | 9/2015 |
| JP | 2018077286 A  | 5/2018 |
| WO | 2016082960 A1 | 6/2016 |
| WO | 2017036871 A1 | 3/2017 |

OTHER PUBLICATIONS

PCT/EP2019/069016, "International Search Report and Written Opinion," dated Sep. 13, 2019, 10 pages.

\* cited by examiner

ILLUMINATION DEVICE, IN PARTICULAR VEHICLE HEADLAMP

CROSS REFERENCE TO RELATED APPLICATIONS

This application claims priority to European Patent Application No. 18185967.9 filed on Jul. 27, 2018 titled "ILLUMINATION DEVICE, IN PARTICULAR VEHICLE HEADLAMP." European Patent Application No. 18185967.9 is incorporated herein by reference.

FIELD OF THE INVENTION

The present invention relates to an illumination device, in particular to a vehicle headlamp, at least comprising one or several lasers emitting light of a first wavelength or wavelength range, a wavelength converting member converting at least part of the light of the first wavelength or wavelength range into light of a second wavelength or wavelength range, a scanning unit adapted to scan one or several laser beams of said one or several lasers across said wavelength converting element in order to generate an illumination pattern formed of the light of at least a part of the unconverted light of the first wavelength or wavelength range and of at least a part of the light of the second wavelength or wavelength range, and, optionally, an imaging optics imaging said illumination pattern to the far field.

Such an illumination device can be used as an adaptive headlamp of a vehicle, being able to dynamically adapt the illumination of the road dependent on the situation.

BACKGROUND OF THE INVENTION

Adaptive headlamps are increasingly used in the automotive sector due to their clear benefits. These headlights are able to dynamically change or adapt the light distribution in front of the vehicle, in particular in the far field, such that a best possible illumination is provided without effecting other road users. If for example an oncoming car appears, the adaptive headlamp may generate a dark section at a position of the car while still maintaining full illumination of the rest of the road.

In order to achieve such a dynamically changing illumination adaptive headlamps provide one or several lasers scanning a wavelength converting member which converts the wavelength of the laser light to a wavelength range being, often together with the unconverted light, suitable for the desired illumination. Typically, a combination of the original wavelength or wavelength range of the laser light and the generated second wavelength range results in a bright white light that is used for illumination of the road. It is also possible to generate the white light directly by the conversion. By appropriately controlling the scanning of the laser beam across the wavelength converting member different illumination patterns can be generated. These illumination patterns are then imaged by an appropriate imaging optics to the far field. An example for such an adaptive headlamp is described in DE 102010028949 A1.

In order to avoid glaring of other road users it is important that the cut-off of the illumination pattern between illuminated regions and dark regions is sufficiently sharp. Since the converting member typically comprises a layer of a wavelength converting material like phosphor, it is difficult to achieve sharp edges with high contrast due to the isotropic nature of the conversion process. The emission of the converter is usually Lambertian resulting either in low efficiency or in the requirement of a very large imaging optics.

For improving such situation, WO2017036871A1 proposed using a collimator bundle behind a phosphor screen. By forming the collimator bundle of a set of individual collimator units, being optically isolated from each other, spreading and intermixing of the light emitted by different surface regions of the phosphor screen is reduced, thus, diminishing blurring and light loss.

SUMMARY OF THE INVENTION

It is an object of the present invention to provide an illumination device, in particular an adaptive headlamp for a vehicle, achieving a cut-off with higher contrast and also a higher efficiency of the illumination when using a low aperture imaging optics.

The object is achieved with the illumination device according to claim 1. Advantageous embodiments of the illumination device are subject of the dependent claims or are disclosed in the subsequent portions of the description.

The proposed illumination device at least comprises one or several lasers emitting light of a first wavelength or wavelength range, a wavelength converting member converting at least part of the light of the first wavelength or wavelength range into light of a second wavelength or wavelength range, a scanning unit adapted to scan one or several laser beams of said one or several lasers across said wavelength converting element in order to generate an illumination pattern formed of the light of the second wavelength or wavelength range or of a combination of the light of the first and the light of the second wavelength or wavelength range, and, optionally, an imaging optics imaging said illumination pattern to the far field.

The one or several lasers may be formed for example by laser diodes. The laser beam(s) emitted by the laser diode(s) is/are preferably focused into the wavelength converting member or on a wavelength converting layer of the wavelength converting member. The wavelength converting member may for example be formed of a ceramic plate of Cerium doped Yttrium-Aluminum-Garnet (YAG). The one or several laser beams are scanned by the scanning unit, preferably formed of a biaxial movable mirror, for example a MEMS mirror, along several scan lines across the wavelength converting member. The scanning pattern is controlled by a controller such that the dynamic adaptation of the illumination pattern to a situation in front of the illumination device is achieved. This controller may be an integral part of the illumination device or an external control device connected to the illumination device. Preferably, the one or several lasers emit blue light, a part of which is converted by the converting member to yellow light such that a combination of the remaining portions of the blue light and the generated yellow light results in white light. The imaging optics is preferably formed of one or several lenses dimensioned to image the illumination pattern on the converting member to the far field.

In order to achieve the above object the proposed illumination device comprises a (first) light guiding structure arranged on the light emitting side of the wavelength converting member and forming a grid of first light guiding channels, guiding the light by total internal reflection. Dependent on the type of the wavelength converting member, i.e. a reflective member or a transmissive member, the light emitting side of the wavelength converting member is the same side on which the laser beam(s) impinge(s) (pumping side) or is the opposed side. The light guiding channels of the first light guiding structure expand in a direction away from said wavelength converting member, i.e. the cross section of each light guiding channel increases from the wavelength converting member to the output side of the light guiding structure. The light guiding channels preferably have a rectangular cross section, but may also have another cross section like a circular, triangular or hexagonal cross section.

Due to the grid of expanding light guiding channels the light of the second wavelength or wavelength range is at least partially collimated so that the light leaving the first light guiding structure is no longer Lambertian. The first light guiding structure reduces crosstalk between emission spots of the wavelength converting member, and thus increases the contrast between illuminated and dark regions in the far field resulting in a sharper cut-off. Such is accomplished by each light guiding channel being receptive mainly for the emission of that area of the wavelength converting member covered by such light guiding channel. With such areas being largely separated from each other, crosstalk between them can be controlled by an appropriate choice of their separation distance, i.e., by an appropriate choice of the pitch between the light guiding channels (i.e., the distance between their centers at the wavelength conversion member) in relation to the size of the cross section of the light guiding channels at the wavelength conversion member and the distance of such cross section to the wavelength conversion member.

Furthermore, due to the collimating nature of the light guiding channels a higher efficiency of illumination is achieved with low aperture imaging optics, in particular with a low aperture imaging lens.

The resolution of the proposed illumination device depends on the number of light guiding channels, their pitch, their dimension, and their distance to the wavelength conversion member. The light guiding channels comprise cross sections at the light emitting side of the first light guiding structure between 0.04 and 0.25 mm². The pitch between the light guiding channels on the light emitting side of the wavelength converting member is preferably between 0.2 and 0.5 mm. In case of rectangular cross sections not being quadratic, this preferable pitch range applies to at least one of the directions, preferably to both directions of the rectangle, each direction being parallel to one of the sides of the rectangle. The aspect ratio (pitch:length) of the light guiding channels is preferably between 1:3 and 1:10, in case of the above rectangular cross sections for at least one, preferably for the pitches of both directions. The first light guiding structure is preferably a prismatic microstructure. The first light guiding structure may be formed of individual rods arranged side by side, each rod forming a light guiding channel due to its higher index of refraction compared with the surrounding air. The rods may be formed for example of a silicone material, e.g. by a casting process. A further possibility is to provide a block of bulk material from which corresponding rods are formed, e.g. by etching, or in which corresponding light guiding channels are formed via local modification (increase) of the refractive index, e.g. by laser treatment. In the latter cases, the pitch and cross section of the light guiding channels may even be smaller than the above preferred range.

In case of a reflective wavelength converting member the light guiding structure also serves to concentrate the light of the laser(s) to small spots on the wavelength converting member. In the following, these spots are referred to as pixels of the illumination pattern. In case of a transmissive wavelength converting member, preferably a second light guiding structure is formed on the light input side (pumping side) of the wavelength converting member and forms a grid of second light guiding channels for the laser beams. The second light guiding channels are arranged such that they correspond to the above first light guiding channels, i.e. are arranged on the same axes. These second light guiding channels then serve to concentrate the light of the laser beam(s) to the individual spots on the wavelength converting layer. Preferably, the cross sections of the second light guiding channels at the wavelength converting member are selected smaller than the cross sections of the first light guiding channels at the wavelength converting member in order to reduce losses of the converted light. The above preferable dimensions of the first light guiding structure and channels also apply to the second light guiding structure and channels. The first and the second light guiding structure are preferably attached such to the wavelength converting member that the light guiding channels are not in direct (optical) contact with the wavelength converting member. Preferably, a gap between the light guiding channels and the wavelength converting member is at least 1 µm, in particular between 1 µm and 50 µm.

It is also possible to attach the first light guiding structure in case of a reflective or transmissive wavelength converting member with direct (optical) contact to the wavelength converting member. This however requires larger angles of the expansion of the light guiding channels compared with the above embodiment without direct contact due to the smaller change of reflective index at the boundary surface to the first light guiding structure. Such larger angles can be realized for example by designing the light guiding channels in the form of a CPC (Compound Parabolic Concentrator) or in the form of a truncated flat (≤45° angle of inclination) pyramid. In such cases, the above mentioned aspect ratios are substantially smaller than in embodiments without direct contact.

If no second light guiding structure is used in case of a transmissive wavelength converting member, the laser(s) should be operated in a pulsed mode such that they only generate the converted light at positions coinciding with the light guiding channels of the first light guiding structure on the wavelength converting member. This pulsed mode is particularly advantageous if the first light guiding structure is in direct optical contact with the wavelength converting member.

The proposed illumination device is preferably used as a laser based high resolution adaptive headlamp in the automotive sector but can also be used for other applications requiring a similar adaptive illumination behavior.

BRIEF DESCRIPTION OF THE DRAWINGS

The present invention is described in the following by way of examples in connection with the accompanying figures. The figures show.

DESCRIPTION OF EMBODIMENTS

Figure 1:
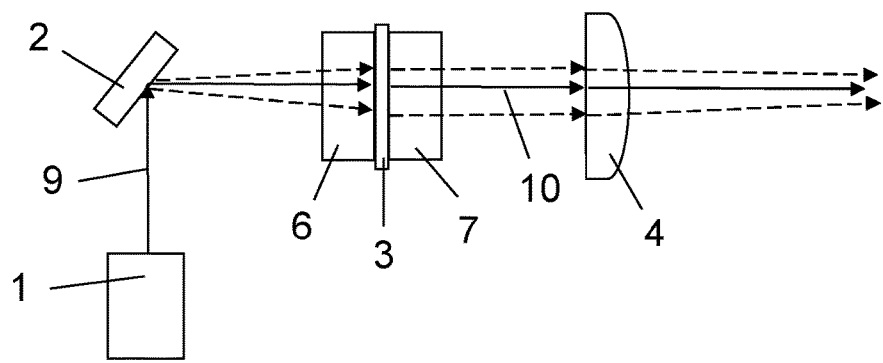
FIG. 1 a schematic sketch of an example of the proposed illumination device.

The proposed illumination device comprises one or several lasers, a laser scanning unit, a wavelength converting member and, optionally, an imaging optics. FIG. 1 shows an exemplary example of such an illumination device which can be used as an adaptive headlamp of a vehicle. The Fig. shows a laser 1 emitting a laser beam 9 in the blue wavelength range. The laser beam 9 is directed to a scanner 2 that scans this laser beam 9 across a wavelength converting member 3 to generate an illumination pattern of converted light 10 in the yellow wavelength range. The scanner 2 is controlled by a control unit (not shown) to scan the laser beam 9 over a converting layer of the wavelength converting member 3 to generate the desired illumination pattern. The illumination pattern is projected with an imaging optics 4, in the present example a lens, to the far field. The wavelength converting member 3 is in this example formed of an optically transparent ceramic plate containing a wavelength converting material like phosphor. On both sides of said wavelength converting member 3 a second, respectively first light guiding structure 6, 7 is attached which is shown in more detail in FIGS. 2 and 3. Although not shown in FIGS. 2 and 3, a small gap of several μm is maintained between the light guiding structures 6, 7 and the wavelength converting member 3.

Figure 2:
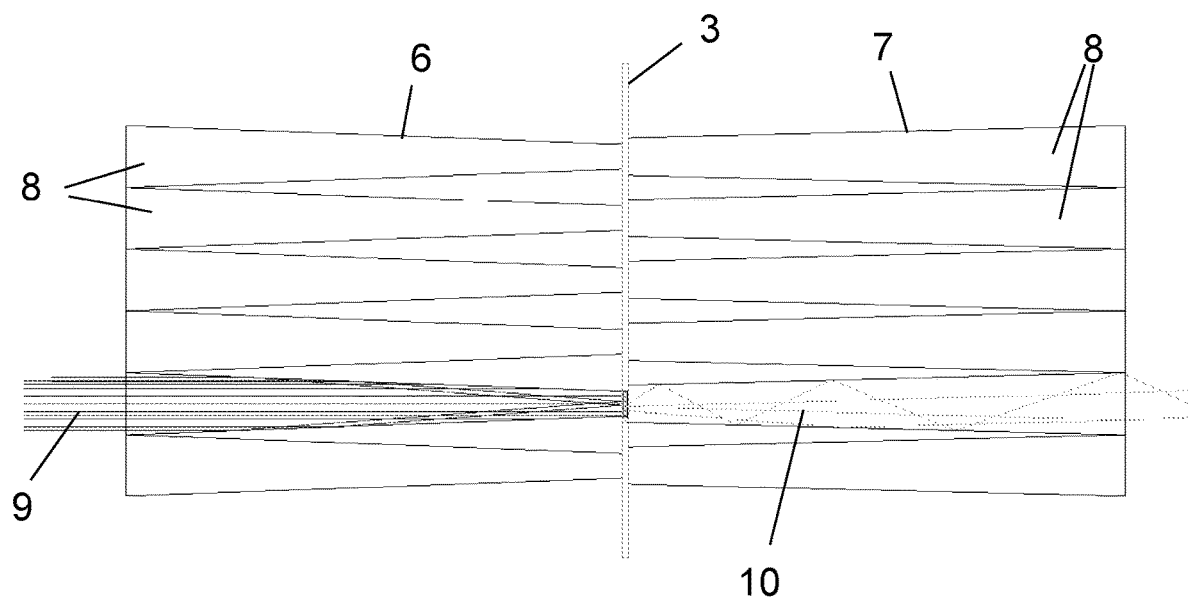
FIG. 2 a cross-sectional view of an exemplary construction of the wavelength converting member with the light guiding members according to the invention.

FIG. 2 shows a cross section of the wavelength converting member 3 with the two attached light guiding structures 6, 7. Both light guiding structures 6, 7 comprise a grid of rectangular tapered rods forming light guiding channels 8 with small diameter at the wavelength converting member and larger diameter on the opposing side. The second light guiding structure 6 on the pumping side of the light converting member 3 concentrates the incoming laser light 9 on respective spots on the wavelength converting member as schematically indicated in FIG. 2. The converted light 10 is coupled into a similar or identical rod or channel of the first light guiding structure 7 arranged on the other side (the light emitting side of the wavelength converting member 3). The corresponding rods or channels 8 of the first light guiding structure 7 on this light emitting side of the wavelength converting member 3 are partially collimating the converted light 10 as schematically indicated in FIG. 2. Therefore, the converted light is no longer Lambertian. The resolution is now limited to the resolution of the first and second light guiding structures 6, 7, but the contrast between the pixels is very high, since there is a strongly reduced crosstalk between the single pixels or spots as a result of the separated guiding channels. Due to the reduced width of emission a higher efficiency can be achieved with a small projection lens. The first and second light guiding structures 7, 6 may each form a grid of at least 10×10 light guiding channels 8, preferably a grid of ≥20×≥50 light guiding channels.

Figure 3:
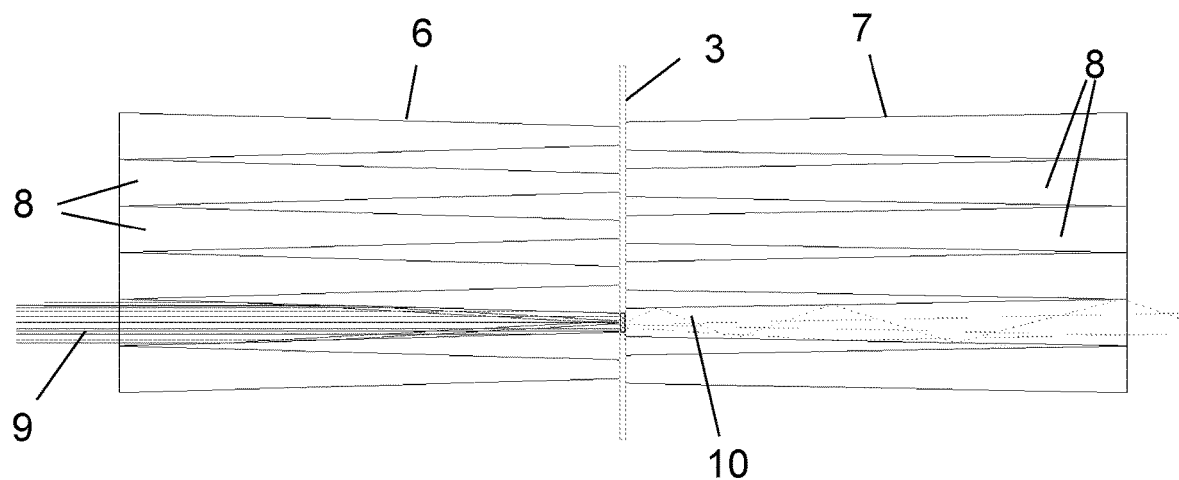
FIG. 3 a cross-sectional view of the wavelength converting member with the light guiding members of FIG. 2 in a plane perpendicular to the plane of FIG. 2.

FIG. 3 shows the wavelength converting member 3 with the first and second light guiding structures 7, 6 in a cross-sectional plane perpendicular to the plane of FIG. 2. As can be seen from FIG. 3, the shape of the light guiding channels is the same as in FIG. 2 and the diameter is smaller in this embodiment but may also be selected identical to the diameter of FIG. 2.

Figure 4:
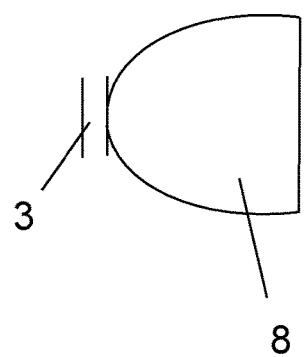
FIG. 4 a cross-sectional view of an exemplary construction of one of the light guiding structures in the form of a CPC according to the invention.

In case of a direct optical contact of the first light guiding structure 7 to the wavelength converting member 3, the shape of the light guiding channels should be realized with larger angles of expansion to avoid high losses. FIG. 4 schematically shows an example of such a light guiding channel or rod 8 having a CPC shape.

While the invention has been illustrated and described in detail in the drawings and forgoing description, such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure and the appended claims. In the claims the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the invention.

LIST OF REFERENCE SIGNS

1 Laser
2 Scanning unit
3 Wavelength converting member
4 Imaging optics
6 Second light guiding structure
7 First light guiding structure
8 Light guiding channel
9 Laser beam
10 Converted light

The invention claimed is:

1. An illumination device, comprising:
one or more lasers that in operation emit one or more laser beams each comprising light of a first wavelength or wavelength range,
a wavelength converting member having a light emitting side,
a scanning unit that in operation scans the one or more laser beams of the one or more lasers across the wavelength converting member, such that the wavelength converting member converts at least part of the light of the first wavelength or wavelength range into light of a second wavelength or wavelength range and generates an illumination pattern formed at least of the light of the second wavelength or wavelength range,
a first light guiding structure arranged on the light emitting side of the wavelength converting member, the first light guiding structure forming a grid of first light guiding channels which each increase in cross section in a direction away from the wavelength converting member, and which are separated from each other at the light emitting side of the wavelength converting member while comprising at least one portion not in direct contact with the wavelength converting member,
the first light guiding channels at the light emitting side of the wavelength converting member having cross sections between 0.04 and 0.25 mm$^2$.

2. The illumination device according to claim 1, further comprising
an imaging optics imaging the illumination pattern to the far field.

3. The illumination device according to claim 1, wherein the wavelength converting member is a reflective member.

4. The illumination device according to claim 1, wherein the wavelength converting member is a transmissive member.

5. The illumination device according to claim 4, wherein a second light guiding structure is arranged on a light input side of the wavelength converting member, the second light guiding structure forming a grid of second light guiding channels corresponding to the first light guiding channels of the first light guiding structure.

6. The illumination device according to claim 5, wherein the second light guiding channels expand in a direction away from the wavelength converting member.

7. The illumination device according to claim 5, wherein cross sections of the second light guiding channels at the wavelength converting member are selected equal to or smaller than cross sections of the first light guiding channels at the wavelength converting member.

8. The illumination device according to claim 5, wherein the second light guiding channels are not in contact with the wavelength converting member.

9. The illumination device according to claim 8, wherein a gap between the second light guiding channels and the wavelength converting member is between 1 μm and 50 μm.

10. The illumination device according to claim 1, wherein the first light guiding channels are not in contact with the wavelength converting member.

11. The illumination device according to claim 10, wherein a gap between the first light guiding channels and the wavelength converting member is between 1 μm and 50 μm.

12. The illumination device according to claim 1, wherein the first light guiding channels are in direct contact with the wavelength converting member and are shaped in form of a Compound Parabolic Concentrator or in form of a truncated flat pyramid.

13. The illumination device according to claim 1, wherein the first light guiding channels comprise rectangular, triangular, hexagonal or circular cross sections.

14. The illumination device according to claim 1, wherein the one or more lasers are laser diodes.

15. The illumination device according to claim 14, wherein the laser diodes emit light in the blue wavelength range as the light of the first wavelength or wavelength range.

16. The illumination device according to claim 1, wherein the first light guiding channels each have a tapered shape.

17. An illumination device, comprising:
one or more lasers that in operation emit one or more laser beams each comprising light of a first wavelength or wavelength range,
a wavelength converting member having a light emitting side and a light input side oppositely positioned from the light emitting side,
a scanning unit that in operation scans the one or more laser beams of the one or more lasers across the light input side of the wavelength converting member, such that the wavelength converting member converts at least part of the light of the first wavelength or wavelength range into light of a second wavelength or wavelength range and generates an illumination pattern formed at least of the light of the second wavelength or wavelength range,
a first light guiding structure arranged on the light emitting side of the wavelength converting member, the first light guiding structure forming a grid of first light guiding channels which expand in a direction away from the wavelength converting member, and which are separated from each other at the light emitting side of the wavelength converting member,
the first light guiding channels at the light emitting side of the wavelength converting member having cross sections between 0.04 and 0.25 mm$^2$.

18. The illumination device according to claim 1, wherein the first light guiding channels are arranged to guide light through total internal reflection.

* * * * *